United States Patent
Strickland et al.

(10) Patent No.: US 10,601,509 B2
(45) Date of Patent: Mar. 24, 2020

(54) MODIFIED NEAR-OPTIMAL LOW-LATENCY COMMUNICATION PATHS FOR GRADED SERVICE

(71) Applicant: Zayo Group, LLC, Boulder, CO (US)

(72) Inventors: Michael Strickland, Buda, TX (US); Daniel Spivey, Jackson, MS (US)

(73) Assignee: ZAYO GROUP, LLC, Boulder, CO (US)

( * ) Notice: Subject to any disclaimer, the term of this patent is extended or adjusted under 35 U.S.C. 154(b) by 31 days.

(21) Appl. No.: 14/542,630

(22) Filed: Nov. 16, 2014

(65) Prior Publication Data

US 2016/0142267 A1 May 19, 2016

(51) Int. Cl.
*H04B 10/25* (2013.01)
*H04B 10/291* (2013.01)

(52) U.S. Cl.
CPC ....... *H04B 10/2503* (2013.01); *H04B 10/291* (2013.01)

(58) Field of Classification Search
CPC ............. H04B 10/2503; H04B 10/291; H04L 12/5695; H04L 47/724; H04L 47/825; H04L 47/805; H04L 47/823; H04L 47/801
See application file for complete search history.

(56) References Cited

U.S. PATENT DOCUMENTS

| | | | | |
|---|---|---|---|---|
| 6,396,586 B1* | 5/2002 | Wei | ...................... | B01L 3/0275 356/246 |
| 7,113,582 B1* | 9/2006 | Mangal | ............... | H04M 7/0057 379/220.01 |
| 8,879,583 B1* | 11/2014 | Brock | ................. | H04L 25/0286 370/480 |
| 2001/0053149 A1* | 12/2001 | Mo | ................... | H04L 29/12009 370/389 |
| 2009/0323582 A1* | 12/2009 | Proctor, Jr. | .............. | H04B 7/04 370/315 |
| 2013/0021909 A1* | 1/2013 | Bader | ................. | H04L 12/5695 370/237 |

* cited by examiner

*Primary Examiner* — Yee Lam
(74) *Attorney, Agent, or Firm* — Jason H. Vick; Sheridan Ross, PC

(57) ABSTRACT

In described embodiments, a relatively optimum, ultra-low latency communication path with communication links operating in accordance herein provide for graded service in a near optimal, ultra-low latency communication system between points A and B. Points A and B are separated geographically over a relatively long distance where the curvature of the earth affects a direct path. Unlike typical systems, to provide the graded service in ultra-low latency networks, the service provider adds delay, or other service degradation, to one or more user connections, which is provided at greater implementation expense (e.g., higher cost to the service provider) in order to provide a lower fee service (e.g., lower cost to the service user) for certain users of the ultra-low latency network.

11 Claims, 3 Drawing Sheets

MODIFIED NEAR-OPTIMAL LOW-LATENCY COMMUNICATION PATHS FOR GRADED SERVICE

BACKGROUND

Traditionally, communication path design selects links within the path based on network requirements for the communication path. Digital transmission systems generally have a set of requirements that include capacity (measured in bits per second), reliability, availability, latency, jitter, bit error rate, and costs. Traditional systems were typically optimized on either capacity or costs, or a combination thereof, while setting threshold requirements for other parameters. In particular there may be a maximum acceptable latency, but cost historically drove much of engineering transmission system design. When engineering a given link, the designer typically would select equipment and routes that provided the lower cost solution.

For business systems, the data rate, or bandwidth offered to a client, is usually the most important driving factor in determining the communication path and technology. Large file transfers typically require high bandwidth, but most requirements had generous thresholds for latency measured in the tens or hundreds of milliseconds or even more. Cost in traditional systems is usually spent to increase the capacity, to improve the reliability and to lower the error rate, rather than to reduce latency So, a customer might want a high speed for the data transfer, but is flexible as to the amount of latency if it reduces cost to the customer. Consequently, while the customer desires an optical link speed, the latency between the points A and B is generally not a key consideration provided a maximal acceptable latency is not exceeded. For example voice systems required the delay to be below that which would be detectable to the human ear (e.g., a few to 100 milliseconds).

Methods to provide a form of graded service typically have focused on the concept of "Quality of Service," commonly referred to as QoS. In QoS, the service quality is affected by various factors, which can be divided into "human" and "technical" factors. Human factors include: stability of service, availability of service, delays, and other impact to user information. Technical factors include: reliability, scalability, effectiveness, and maintainability. However, for these networks, providing higher levels of QoS (e.g., more bandwidth, higher signal quality, etc.) requires investing more in each user's provisioned service facilities. For example, two users might be provisioned for service between two points. A first user with higher level of service might have a guarantee of a certain high level throughput, the second user a guarantee of a lower level of throughput. Service providers will dedicate more resource, and hence higher expense, to the first user, while dedicating less resource to the second user. Thus, the service provider provides the second user's throughput at less expense, and so charges less for the lower throughput service. But these services do not account for latency in the engineering design of the network at the outset.

Only recently, with computer-executed financial transactions and similar applications, has minimizing latency become of interest, generating a need for ultra-low latency service. Some systems have been designed so that the links provide a relatively shortest terrestrial path between two points A and B to reduce latency, though these systems are restricted to the earth's ground topology when selecting the links. In such systems, termed "ultra-low latency networks" herein, the latency is the signal propagation delay and signal processing delay of both regeneration and repeating. For example, a microwave link or optical fiber link has a propagation delay of the signal through the medium (air or fiber) over the distance traveled, and regeneration delay at microwave towers or optical terminals. Microwave systems have lower propagation delay than traditional fiber systems because the speed of light in optical fiber is only about 70% of the speed of light through air or vacuum. However, because such systems are subject to topology restrictions over the route, an absolute straight line between the two points generally cannot be achieved when the points are separated by a relatively great distance. For example, crossing Pennsylvania, the Appalachians are encountered, and a shortest path might require a tunnel through a mountainside. At the extreme, it would be prohibitively long term and expensive to drill a tunnel between two points to obtain a direct link, and as the distance between the points increases, the tunnel edges closer to the bottom of the earth's mantle. To calculate the total system delay, the processing delay and the propagation delay must be summed and so, from a system standpoint, complex trade-offs are evaluated for a given design.

Such services by ultra-low latency networks have been subject to opposition. As one method of addressing such advantages, agencies have proposed inserting delay at the front end of individual market clients to tune delays experienced by all market users to be substantially equivalent. Thus, all users of the low latency service networks providing such communications would have equivalent grades of service.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In an exemplary embodiment, an ultra-low-latency communication system transfers a signal between two end points on earth separated by a distance, the two end points coupled by communication links through one or more intermediate nodes. The signal i) passes through the communication links and the one or more intermediate nodes, and ii) the signal includes two or more signal components, each signal component carrying information and assigned a grade of service between the two endpoints. At least one graded service device is inserted into the communication links, each graded service device including circuitry to separate the signal components at a corresponding node, circuitry to add delay to a corresponding signal component, and circuitry to combine the two or more signal components after separation. The at least one graded service device separates the signal into the two or more signal components, one signal component passing unprocessed and another signal component delayed by a predetermined value by the circuitry to delay a corresponding signal component. The at least one graded service device combines each unprocessed signal component and each delayed signal component into an output signal, wherein a grade of service of the delayed signal component is lower than a grade of service of the unprocessed signal component.

BRIEF DESCRIPTION OF THE DRAWING FIGURES

Other aspects, features, and advantages of described embodiments will become more fully apparent from the following detailed description, the appended claims, and the accompanying drawings in which like reference numerals identify similar or identical elements.

DETAILED DESCRIPTION

In accordance with exemplary embodiments, a relatively optimum, ultra-low latency communication path with communication links operating in accordance herein provide for graded service in a near optimal, ultra-low latency communication system between points A and B, where points A and B are separated geographically over a relatively long distance where the curvature of the earth affects a direct path. Unlike typical systems, to provide the graded service in ultra-low latency networks, the service provider adds delay, or other service degradation, to one or more user connections, which is provided at greater implementation expense (e.g., higher cost to the service provider) in order to provide a lower fee service (e.g., lower cost to the service user) for certain users of the ultra-low latency network.

As described herein, exemplary embodiments might employ one or more of free space optical communications, fiber optic communications and high frequency microwave (including millimeter wave) communications between points A and B. Such relatively optimum, low-latency communication path employs links so as to provide the relatively optimum, low-latency communication path with graded service. In ultra-low latency communication networks, the service provider typically provides the path: in other words, the service provider might provide an un-improved (e.g., "dark") optical path, or a lit optical path without or with minimal link processing or overlay such as error detection/correction, control, and the like. Consequently, the pricing structure of a graded ultra-low latency service is based on per unit time lease/rent of the path for the user to communicate over, while the user provides the transmission and reception terminals (e.g., including, but not limited to, data processing, error detection/correction overlay, etc.). Therefore, the service provider in graded ultra-low latency networks has limited options in network design to affect the user traffic carried over the ultra-low latency path. The pricing structure of a graded ultra-low latency service is based on the ultra-low latency characteristic of the user's path: absolute lowest latency is highest price (e.g., $15X per month), while higher latency paths have lower price (e.g., $X per month). Through offering different speeds and observing the market's reaction, the latency premium for the embodied example goes away at around 16 ms of delay end to end. Therefore, 16 ms delay for the lowest grade (e.g., highest latency) of the ultra-low latency path is priced the same as another or data communication standard carrier's 18 ms to 20 ms delay in service between the same exemplary endpoints. Consequently, the market customer for ultra-low latency service at the lowest grade enjoys slightly faster service when compared to standard carrier's service. However, the operator of the ultra-low latency network provides such lowest grade with increased complexity and expense.

Figure 1:
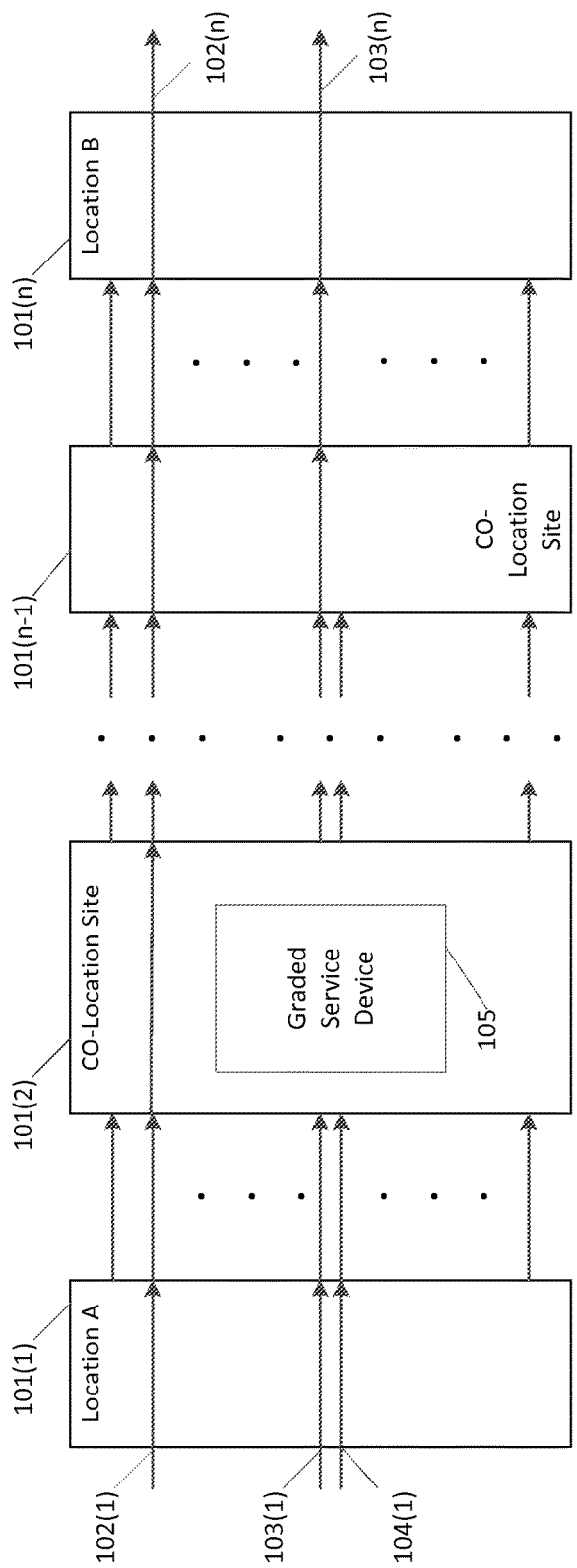
FIG. 1 shows an ultra-low latency network providing graded service in accordance with an exemplary embodiment.

FIG. 1 shows an ultra-low latency network providing graded service levels in accordance with an exemplary embodiment. The ultra-low latency network includes transmission equipment in locations 101(1) through 101(n) providing service between node A (at Location A) and node B (at Location B). Intermediate nodes of the network might be central office (CO) location sites (e.g., 101(2) through 101(n−1)) selected during network engineering and chosen to provide the ultra-low latency communication between nodes A and B. As shown in FIG. 1, ultra-low latency communication paths 102, 103 and 104 transfer data between nodes A and B. Communication path 102 comprises links 102(1) through 102(n); communication path 103 comprises links 103(1) through 103(n); and Communication path 104 comprises links 104(1) through 104(n). Communication path 102, for example, is a direct path providing the lowest latency (e.g., highest grade of service), while communication paths 103 and 104 might have lower grades of service implemented, as described subsequently, through processing by at least one graded service device.

For an exemplary network, such as from Chicago to New York, an optical fiber type used might be OFS TrueWave® RS Fiber, an industry standard fiber used for long-haul transmission networks suitable for single wave, WDM (wavelength division multiplex), and DWDM (Dense WDM) transmission. The fiber optic cable is installed in buried HDPE (High Density Polyethylene) conduit. The optical amplification facilities are spaced 120 kilometers apart to minimize the amplification and regeneration required, significantly lowering network latency and the cost of optical equipment needed to light the fiber. A fully managed and secure point-to-point service provides ultra-low latency (SLA) of 15.9 milliseconds roundtrip from Chicago to New York (e.g., Carteret/Secaucus/Newark). Each customer's service is delivered on a dedicated wavelength of light, over advanced DWDM network with no shared bandwidth (e.g., Bandwidth options might be from 10 Gbps to 8 Tbps; Dedicated Wavelength options: 1 Gigabit Ethernet, 10 Gigabit Ethernet, and 100 Gigabit Ethernet).

As an aid to understanding the described embodiments, the following description of latency might facilitate such understanding of the above-referenced engineering considerations. As stated, the optimization criterion herein is an algorithm cost function with minimized latency (total time required for the signal to be generated at site A, to be transmitted through equipment and transmission medium, and to be received at site B) based on lowest latency path between two points A and B. Thus, the latency requirement is to be as close as possible to the free space speed of light time for the direct path between points A and B.

The total transmission system latency for such link is the sum of the propagation latency through the media and the processing latency across all nodes in the link needed to repeat and/or regenerate the signal; that is, the time from the transmission of bits at A to the successful reception of the bits at B. The propagation latency is the product of (i) the speed of electro-magnetic waves (i.e., the speed of light) through the medium (either through fiber or air, respectively for fiber optic and wireless systems) X (ii) the length of the communications link. The speed of light in a vacuum is approximately $3 \times 10^8$ m/sec and is frequently denoted by the letter 'c'. In air, the speed of light is c/1.0003, and the speed of light in fiber is c/1.47. Consequently, theoretically for each 100 miles of system length a wireless system can gain 0.252 milliseconds of delay over a fiber optic system if no regeneration is required.

Further, processing latency should also be reduced and/or minimized during link selection. As a signal travels through a medium, the signal weakens in strength, and degenerates until the signal level falls below a threshold for which it cannot be recovered. Communications systems regenerate the signal at nodes along the path or repeat the signal while amplifying the strength of the signal (repeaters). Given the availability of spectrum for high capacity microwave systems in the United States and the signal degeneration caused by atmosphere, the mean length of links on a terrestrial system of several 100s of miles or more is likely to be 30 miles or less. A terrestrial link from NYC to Chicago, for example, might require 25 or more tower sites where the signal is repeated or regenerated if implemented as a terrestrial communication path. Each such point adds processing latency, particularly if the signal is regenerated.

Figure 2:
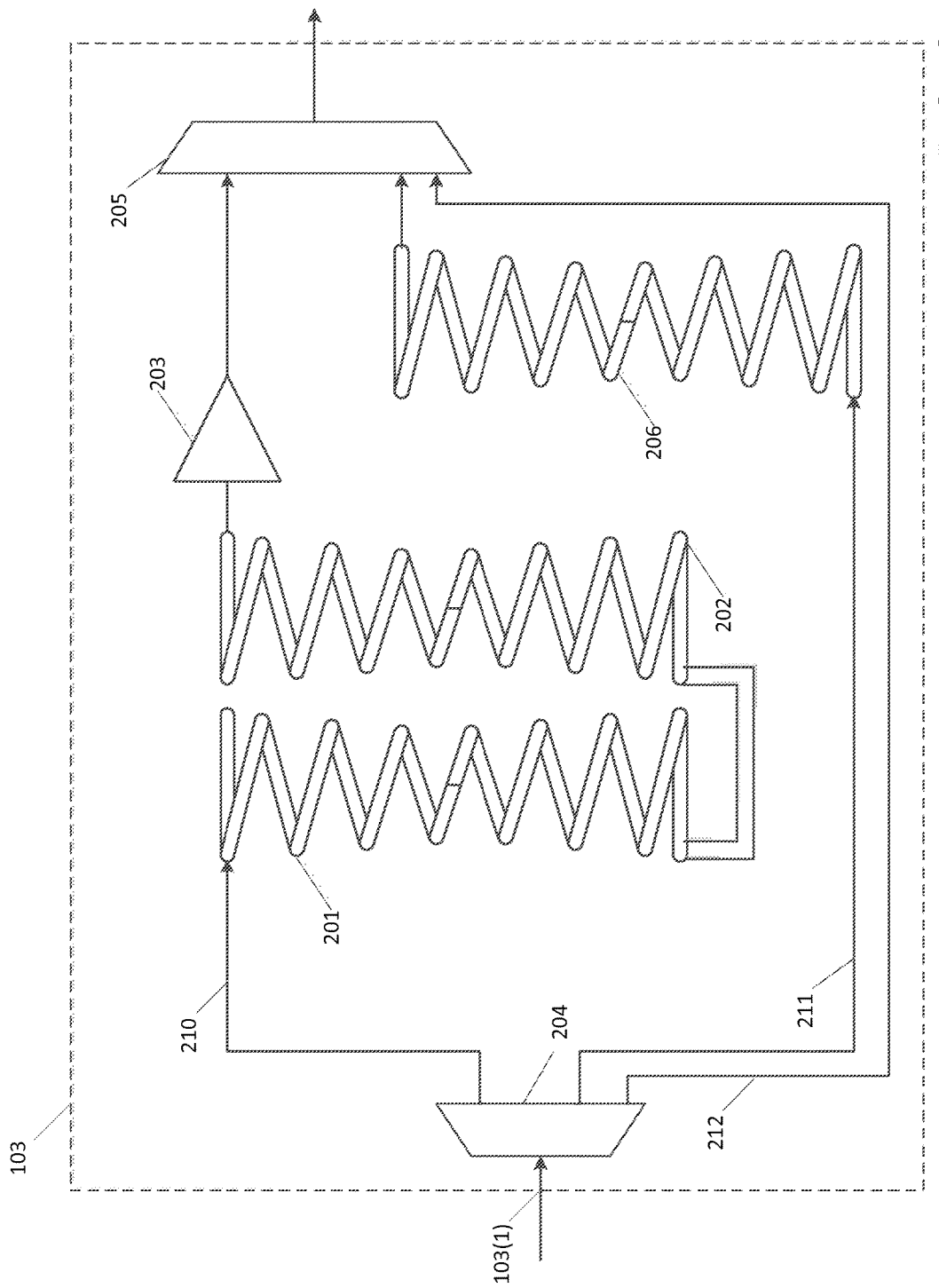
FIG. 2 shows an exemplary embodiment of a graded service device as shown in FIG. 1.

Returning to FIG. 1, CO-Location Site 101(2) includes graded service device 105. Graded service device 105 might be employed to introduce controlled amounts of latency into components of communication paths passing though graded service device 105. Since, for example, optical communication paths might include several user data channels, each user data channel might require differing amounts of delay introduced to the signal depending on the grade of service purchased FIG. 2 shows an exemplary embodiment of a graded service device as shown in FIG. 1. As shown in FIG. 2, link 103(1) of communication path 103 is provided to an optical de-multiplexer, shown as Demux 204, which splits the input optical signal into components representing user data channels, shown as components 210, 211 and 212. Components 210, 211 are processed, component 212 remains unprocessed, and components 210, 211 and 212 are then re-combined as a multiplexed signal by a multiplexer, shown as Mux 205, into an output optical signal.

Component 210 is provided to a first path comprising first optical fiber coil 201, second optical fiber coil 202 and optical amplifier 203. First optical fiber coil 201 represents 40 km of fiber (e.g., single mode fiber), second optical coil represents 40 km of fiber, and so the optical signal passes through 80 km of fiber. Since the optical signal passes an 80 km distance, the optical signal is delayed 391.6 us. As would be apparent to one skilled in the art, since a designer engineers the network for a certain inserted delay, the fiber distances of the described optical finer coils herein are exemplary only, and might be of any length necessary to achieve the desired optical signal delay. Such optical fiber coils 201 and 202 are known and be implemented with, for example, a Fiber Lab 3200 available from M2 Optics. Since the optical signal passes through a relatively great distance, amplification of the optical signal might be required, as illustrated by amplifier 203 in FIG. 2. Delay through such amplifier is relatively small compared to the delay through the optical fiber coils.

In a similar manner, component 211 is provided to a second path comprising third optical fiber coil 206. Third optical fiber coil 206 represents 30 km of fiber (e.g., single mode fiber), so the optical signal passes through 30 km of fiber, and experiences a delay of 146.85 us. For this path, optical signal attenuation is low enough that an amplification of the signal might not be required. Component 212, as described previously, is subject to minimal delay. Thus, a graded service device as shown in FIG. 2 provides at least three grades of service in an ultra-low latency network. As would be apparent to one skilled in the art, more or less grades of service might be provided, and additional graded service devices might be employed at a single location or at various locations within the network based on engineering requirements.

In addition, since add-drop de-multiplexing and multiplexing is provided at the graded service device, such provisioning of service grades or latency might be programmable within the device. Since routing inside of the device might select more or less coils of fiber, the delay inserted, and hence latency provided for a user data service, can be set by the network operator according to service provisioning requirements at various times. In addition, such latency can be variable between locations in the network. For example, provisioning might be set so that the delay added to the optical signal carrying the user data is distributed through the network. Consequently, the user data might experience no added delay between location 101(1) (e.g., node A) and location site 101(2), and thus have ultra-low latency to that location at node A, but then have considerable delay added between location 101(n-1) and location 101(n) (e.g., node B) to provide the lower-priced service to the user (i.e., market client). Alternatively, the network operator might add delay at each of the locations 101(1) through 101(n) to, for example, minimize signal loss between each optical signal repeater, or make delay more uniform for timing purposes (e.g., avoid skew).

Figure 3:
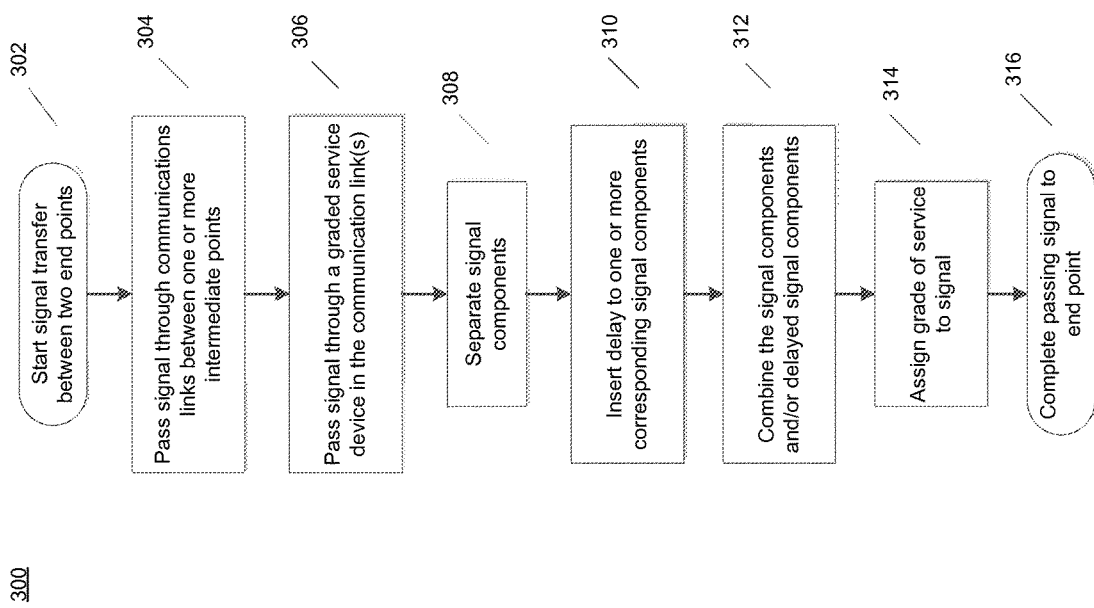
FIG. 3 shows a flow chart of an exemplary method for providing an ultra-low latency network providing graded service in accordance with an exemplary embodiment.

FIG. 3 shows a flow chart of method 300 for providing graded services in an ultra-low latency network. At step 302, a transfer of a signal between two end points on earth separated by a distance in the ultra-low-latency communication system is started. At step 304, the signal is passed through communication links of one or more intermediate nodes between the two end points. In some embodiments, the signal includes multiple signal components with each signal component carrying information and assigned a grade of service between the two endpoints. At step 306, the signal is passed through at least one graded service device inserted into the communication links. At step 308, the signal is separated into components at a corresponding network node, and at step 310, delay is added to one or more of the corresponding signal components. At step 312, the signal components are re-combined after separation (and delay, if one or more of the signal components had delay inserted at step 310). In described embodiments, passing the signal through a graded service device separates the signal into the multiple signal components, passes one signal component unprocessed, delays another signal component by a predetermined value, and combines each unprocessed signal component and each delayed signal component into an output signal. At step 314, a grade of service assigned to the delayed signal component is lower than a grade of service assigned of the unprocessed signal component. At step 316, process 300 completes.

Described embodiments provide for a relatively near-optimum, low-latency communication path between the two end points A and B that allows for graded service. Application for such link might be preferred for computer or similar executed transactions, where signals generated through different sources compete to reach a destination computer to execute the transaction such as in "flash" trading, but where the clients must trade-off absolute highest cost for the lowest latency against lower cost with slightly higher latency. For example, financial institutions, investment houses and the like might employ computers to execute transactions to automatically cover or hedge positions. Similarly, other types of computer bidding platforms, such as auction platforms, benefit from low-latency signaling to effect a transaction at a preferred price, but might not require the highest cost, absolute lowest latency path if not engaged in "flash" trading. Finally, automated decision systems might benefit from the advantages that low-latency signaling provides to execute such decision before a competitor.

Reference herein to "one embodiment" or "an embodiment" means that a particular feature, structure, or characteristic described in connection with the embodiment can be included in at least one embodiment. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

Aspects of described embodiments may be implemented as circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, micro-controller, or general-purpose computer.

Described embodiments might be implemented in the form of methods and apparatuses for practicing those methods. Described embodiments might also be implemented in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the embodiments. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the embodiments. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the described embodiments.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

Unless explicitly stated otherwise, each numerical value and range should be interpreted as being approximate as if the word "about" or "approximately" preceded the value of the value or range.

Signals and corresponding nodes or ports may be referred to by the same name and are interchangeable for purposes here.

No claim element herein is to be construed under the provisions of 35 U.S.C. § 112, sixth paragraph, unless the element is expressly recited using the phrase "means for" or "step for."

It will be further understood that various changes in the details, materials, and arrangements of the parts which have been described and illustrated in order to explain the nature of various embodiments may be made by those skilled in the art without departing from the scope of the invention as expressed in the following claims.

We claim:

1. An ultra-low-latency communication system for transferring a signal between two end points on earth separated by a distance, the communication system comprising:
   one or more intermediate nodes between the two end points, the two end points coupled by communication links through the one or more intermediate nodes, wherein the signal i) passes through the communication links and the one or more intermediate nodes, and ii) includes two or more signal components, each signal component a physical signal carrying information and assigned a grade of service between the two endpoints; and at least one graded service device inserted into the communication links, each graded service device including circuitry to separate the two or more signal components at a corresponding node, circuitry to add propagation delay to a corresponding signal component, and circuitry to combine the two or more signal components after separation;

wherein, the at least one graded service device is configured to separate the signal into the two or more signal components, one signal component passing unprocessed and another signal component delayed by a predetermined value by the circuitry to add the propagation delay to a corresponding signal component, and configured to combine each unprocessed signal component and each delayed signal component into an output signal, and wherein a grade of service of the delayed signal component is lower than a grade of service of the unprocessed signal component, wherein, for a certain graded service device:
the circuitry to separate the signal components at a corresponding node is a demultiplexor (DeMux);
the circuitry to add delay to a corresponding signal component includes at least one transmission coil, and
the circuitry to combine the two or more signal components after separation is a multiplexor (MUX), wherein the at least one graded service device separates the signal into a plurality of signal components, at least one signal component passing unprocessed and each other signal component delayed by a corresponding predetermined value by the circuitry to delay a corresponding signal component, and wherein a grade of service of a certain delayed signal component is lower than a grade of service of each other signal component having less added delay than the certain delayed signal component.

2. The ultra-low-latency communication system of claim 1, wherein, the communication links are optical communication links, the DeMux is an optical DeMux, the Mux is an optical Mux, and the at least one transmission coil is an optical fiber coil.

3. The ultra-low-latency communication system of claim 1, wherein, the circuitry to add delay to a corresponding signal component includes a repeater.

4. The ultra-low-latency communication system of claim 1, wherein, for a certain graded service device, the at least one communication link is a microwave link, and wherein:
the circuitry to add delay to a corresponding signal component includes at least one microwave repeater.

5. The ultra-low-latency communication system of claim 1, wherein, a cost to provide a lower grade of service is higher than a cost of providing a higher grade of service, and a charge to provide the lower grade of service is lower than a charge of providing the higher grade of service.

6. A method of transferring a signal between two end points on earth separated by a distance in an ultra-low-latency communication system, the method comprising:
passing the signal through communication links of one or more intermediate nodes between the two end points, wherein the signal includes two or more signal components, each signal a physical signal component carrying information and assigned a grade of service between the two endpoints; and passing the signal through at least one graded service device inserted into the communication links, including:
separating the two or more signal components at a corresponding node,
adding propagation delay to a corresponding signal component, and
combining the two or more signal components after separation;

wherein, the passing the signal through at least one graded service device separates the signal into the two or more signal components, passes one signal component unprocessed, delays propagation of another signal component by a predetermined value, and combines each unprocessed signal component and each delayed signal component into an output signal, and wherein a grade of service of the delayed signal component is lower than a grade of service of the unprocessed signal component, wherein, for a certain graded service device:
the circuitry to separate the signal components at a corresponding node is a demultiplexor (DeMux);
the circuitry to add delay to a corresponding signal component includes at least one transmission coil, and
the circuitry to combine the two or more signal components after separation is a multiplexor (MUX), wherein the at least one graded service device separates the signal into a plurality of signal components, at least one signal component passing unprocessed and each other signal component delayed by a corresponding predetermined value by the circuitry to delay a corresponding signal component, and wherein a grade of service of a certain delayed signal component is lower than a grade of service of each other signal component having less added delay than the certain delayed signal component.

7. The method of claim 6, wherein, the communication links are optical communication links, the DeMux is an optical DeMux, the Mux is an optical Mux, and the at least one transmission coil is an optical fiber coil.

8. The method of claim 6, wherein, the adding delay to a corresponding signal component includes a passing the corresponding signal component through a repeater.

9. The method of claim 6, wherein, for a certain graded service device, the at least one communication link is a microwave link, and wherein:
the adding delay to a corresponding signal component includes passing the signal through at least one microwave repeater.

10. The method of claim 6, wherein, a cost to provide a lower grade of service is higher than a cost of providing a higher grade of service, and a charge to provide the lower grade of service is lower than a charge of providing the higher grade of service.

11. A non-transitory machine-readable storage medium, having encoded thereon program code, wherein, when the program code is executed by a machine, the machine transfers a signal between two end points on earth separated by a distance in an ultra-low-latency communication system, comprising:
passing the signal through communication links of one or more intermediate nodes between the two end points, wherein the signal includes two or more signal components, each signal component a physical signal carrying information and assigned a grade of service between the two endpoints; and passing the signal through at least one graded service device inserted into the communication links, including:

separating the two or more signal components at a corresponding node, adding propagation delay to a corresponding signal component, and combining the two or more signal components after separation;

wherein, the passing the signal through at least one graded service device separates the signal into the two or more signal components, passes one signal component unprocessed, delays propagation of another signal component by a predetermined value, and combines each unprocessed signal component and each delayed signal component into an output signal, and wherein a grade of service of the delayed signal component is lower than a grade of service of the unprocessed signal component, wherein, for a certain graded service device:
the circuitry to separate the signal components at a corresponding node is a demultiplexor (DeMux);
the circuitry to add delay to a corresponding signal component includes at least one transmission coil, and
the circuitry to combine the two or more signal components after separation is a multiplexor (MUX), wherein the at least one graded service device separates the signal into a plurality of signal components, at least one signal component passing unprocessed and each other signal component delayed by a corresponding predetermined value by the circuitry to delay a corresponding signal component, and wherein a grade of service of a certain delayed signal component is lower than a grade of service of each other signal component having less added delay than the certain delayed signal component.

* * * * *